Oct. 1, 1957  J. M. CRAWFORD ET AL  2,808,577
METHOD OF AND APPARATUS FOR DETERMINING
THE TRAVEL TIME OF SIGNALS
Filed June 27, 1955  5 Sheets-Sheet 2

INVENTORS
JOHN M. CRAWFORD
WILLIAM E. N. DOTY
BY
*Jerry J. Dunlap*
ATTORNEY

Oct. 1, 1957  J. M. CRAWFORD ET AL  2,808,577
METHOD OF AND APPARATUS FOR DETERMINING
THE TRAVEL TIME OF SIGNALS
Filed June 27, 1955  5 Sheets-Sheet 3

JOHN M. CRAWFORD &
WILLIAM E. N. DOTY

INVENTORS

BY *Jerry J. Dunlap*

ATTORNEY.

JOHN M. CRAWFORD &
WILLIAM E. N. DOTY

INVENTORS

BY

ATTORNEY

Oct. 1, 1957　　　J. M. CRAWFORD ET AL　　2,808,577
METHOD OF AND APPARATUS FOR DETERMINING
THE TRAVEL TIME OF SIGNALS
Filed June 27, 1955　　　　　　　　　5 Sheets-Sheet 5

JOHN M. CRAWFORD &
WILLIAM E. N. DOTY
　　INVENTORS

BY *Jerry J. Dunlap*

ATTORNEY

United States Patent Office 2,808,577
Patented Oct. 1, 1957

2,808,577

METHOD OF AND APPARATUS FOR DETERMINING THE TRAVEL TIME OF SIGNALS

John M. Crawford and William E. N. Doty, Ponca City, Okla., assignors to Continental Oil Company, Ponca City, Okla., a corporation of Delaware Application June 27, 1955, Serial No. 518,014

13 Claims. (Cl. 340—15)

This application is a continuation-in-part of our co-pending application, Serial No. 426,182, filed April 28, 1954, which in turn is a continuation-in-part of our application, Serial No. 339,374, filed February 27, 1953, now U. S. Patent No. 2,688,124, dated August 31, 1954.

Said prior applications are concerned with the process of determining the travel time of a signal between spaced points wherein there is transmitted from a local area a vibratory signal made up of a succession of energy pulses which, after propagation over a plurality of paths, is then detected as a composite signal in a remote local area, which transmitted signal is non-repetitive during a time interval which is substantially longer than the travel time of such signal along any of said paths by which it reaches the detection area at usable energy levels and in which, for a predetermined period which is at least as long as said travel time plus the uninterrupted duration of said transmitted signal or two times the travel time whichever is the shorter, there are simultaneously and individually recorded time series respectively representative of said transmitted signal and said composite signal and such time series are then correlated while shifting the time-phase relation thereof with respect to their time-phase relation as originally recorded and in which the amount of said time-phase shift which yields the greatest magnitude of the correlation value is a parameter of said travel time.

The present invention is an improvement in the method of our said earlier applications providing a greater degree of precision with which the travel time may be determined.

It is a principal object of this invention to provide a method for modifying the shape of the correlation curve obtained when practicing the methods disclosed in our aforesaid applications.

It is a further object of this invention to provide a method for reducing the effect on the shape of the correlation curve of the attenuation of the signal by the propagating medium.

Another object of this invention is to provide a method by means of which the shape of the correlation curve, particularly in the neighborhood of its maxima, is such that the amounts of time phase shift corresponding to these maxima may be determined without ambiguity and with great accuracy.

Other and more particular objects of this invention will appear as the description proceeds.

The following description and the annexed drawings are merely illustrative of some modes by which this invention may be carried out and its use in other fields will be apparent.

In said annexed drawings.

Broadly stated, the invention relates to an improvement in the process of determining the travel time of a signal between spaced points wherein there is transmitted from a local area a vibratory signal made up of a succession of energy pulses which, after propagation over a plurality of paths, is then detected as a composite signal in a remote local area, which transmitted signal is non-repetitive during a time interval which is substantially longer than the travel time of such signal along any of said paths by which it reaches the detection area at usable energy levels and in which, for a predetermined period which is at least as long as said travel time plus the uninterrupted duration of said transmitted signal or two times the travel time whichever is the shorter, there are simultaneously and individually recorded time series respectively representative of said transmitted signal and said composite signal and such time series are then correlated while shifting the time-phase relation thereof with respect to their time-phase relation as originally recorded and in which the amount of said time-phase shift which yields the greatest magnitude of the correlation value is a parameter of said travel time, which improvement comprises intensifying the effect of at least a portion of at least one of said time series upon said correlation values to counteract the effects on said correlation values which are due to the unequal attenuation by the propagating medium of different frequency components of said transmitted signal.

Throughout the specification and in the appended claims, whenever reference is made to intensifying the effect of at least a portion of at least one of said time series upon said correlation values, it is to be understood that this includes not only a direct modification or alteration of the time series, but also any modification or alteration of any of the variable factors which affect the time series.

The method of determining the travel time by multiplication and integration of the transmitted signal by the received signal, while altering their time phase relation, hereinafter referred to as the correlation method, has been described at length in our said earlier applications.

In the use of this method, the accuracy with which the travel time may be determined is dependent largely upon the shape and characteristics of the correlation curve.

The shape of this curve, the result of the multiplying and integrating steps, is a function of the amount of energy in the different frequency components of the transmitted and received signals.

Figure 1:
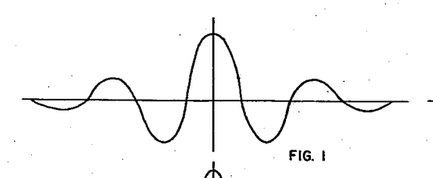
Fig. 1 is a representation of the shape of the correlation curve obtained when the frequency range of the transmitted signal is limited to one octave and when all frequencies generated within said octave carry the same amount of energy and receive equal or no attenuation from the propagating medium.
Figure 2:
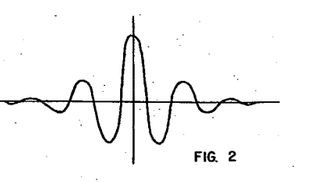
Fig. 2 is a representation of the shape of the correlation curve obtained when the frequency range of the transmitted signal is again one octave but at higher frequencies, and when the two other conditions of Fig. 1 are still fulfilled within this one octave high frequency range.

The correlation curve illustrated in Fig. 1 is the theoretical curve derived by the correlation of a transmitted signal, whose frequency range is limited to one octave, with the same signal after propagation through an ideal medium in which there is no attenuation. Thus, it is truly the autocorrelation curve of the transmitted signal. The correlation curve shown in Fig. 2 is that secured under the same conditions but with the frequency of the signal a single octave higher than used in forming the curve of Fig. 1. In other words, all the frequencies of the signals used in forming Fig. 2 are first harmonics of the ones used in forming Fig. 1. It will be noted that the oscillation rate of the correlation curve of Fig. 2 is double the corresponding rate of the correlation curve of Fig. 1.

From a a comparison between Figs. 1 and 2, it will be noted that the higher frequencies make possible a more accurate definition of the travel time and make it possible to distinguish between events which are twice as closely spaced as when the lower frequencies are used.

Figures 3, 4:
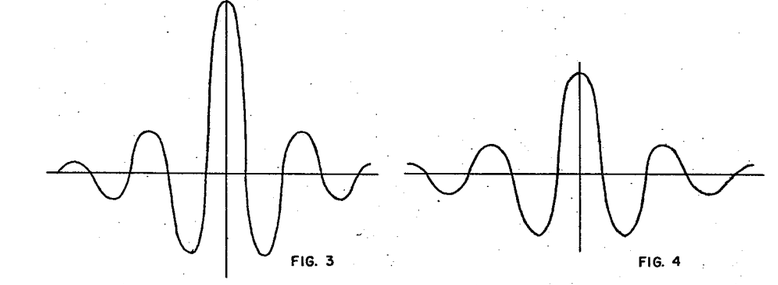
Fig. 3 indicates the shape of the correlation curve when the frequency range is extended to two octaves, and when there is no attenuating effect by the propagation medium.
Fig. 4 indicates the shape of the correlation curve when the frequency range is again equal to two octaves but when the amount of energy carried by the high frequencies is lower than the amount carried by the low frequencies.
Figure 8:
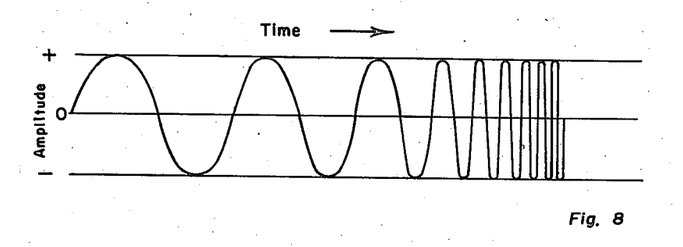
Fig. 8 is a schematic representation of a transmitted or counterpart signal having a frequency range of about 2 octaves and having a uniform amplitude throughout the frequency range. This curve may also be considered a representation of a received or composite signal which has been propagated through a non-attenuating medium.
Figure 9:
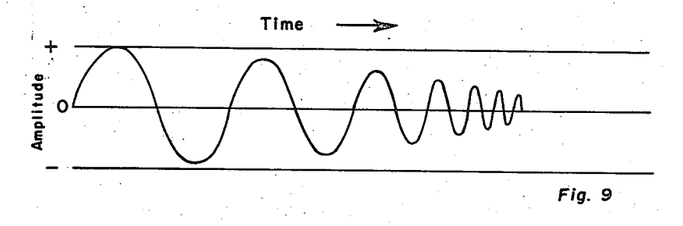
Fig. 9 is a representation of a typical received or composite signal which has been propagated through a medium, which medium has attenuated the higher frequency components of the signal.

If the frequency range of the signal is extended to two octaves, the amplitude of the transmitted signal is uniform throughout the frequency range, and the propagating medium has the same ideal properties over that range; both the received and counterpart signals will have an equal amplitude over the entire frequency range as illustrated in Fig. 8, and the shape of the correlation curve changes and becomes as indicated in Fig. 3. The difference between the amplitude of the maximum and the amplitude of the secondary maxima is greater than in the preceding case and the rate of oscillations corresponds to the average frequency of the signal. The frequency of the transmitted signal on which is based the correlation curve indicated in Fig. 4 is the same as the frequency of the signal in Fig. 3, but in Fig. 4 the propagating medium is assumed to have severely attenuated the high frequencies; as illustrated in Fig. 9.

When it is assumed that the propagation medium very severely attenuates the high frequencies (and this is the case when elastic wave signals are propagated through the earth as in seismic exploration) then the relative amplitudes of the high and low frequencies in the received signal may be in ratios like 1 to 10 or even 1 to 100. In such cases, the corresponding products obtained during the correlation process will be in the same ratio and accordingly the high frequency components will have contributed very little to the sum obtained by the integration of these products. Accordingly, the variations in the correlation values will be at a relatively slow rate since they will be determined largely by the lower frequencies as illustrated for example in Fig. 1 in comparison to Fig. 2. Stated in another way, the substantial attenuation of the high frequency components by the propagating medium is in effect, for certain purposes at least, substantially the same as a narrowing of the frequency spectrum of the transmitted signal.

By comparison of Figs. 3 and 4 it is seen that the attenuation of the high frequencies in the received signal causes a reduction of the ratio of amplitudes between the major and secondary maxima and also lowers the rate of oscillation of the resulting correlation curve. Thus, the curve of Fig. 3 has a larger ratio between the maximum and the adjacent peaks than the curve of Fig. 4.

Figure 5:
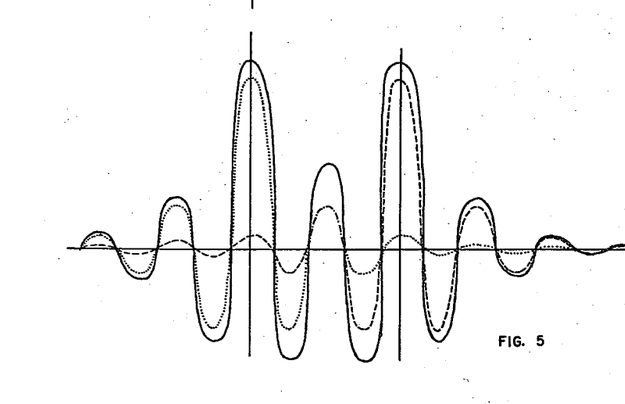
Fig. 5 indicates the shape of the correlation curve when two events occur at nearly the same time and wherein the conditions of frequency and attenuation are similar to those described in connection with Fig. 3.
Figure 6:
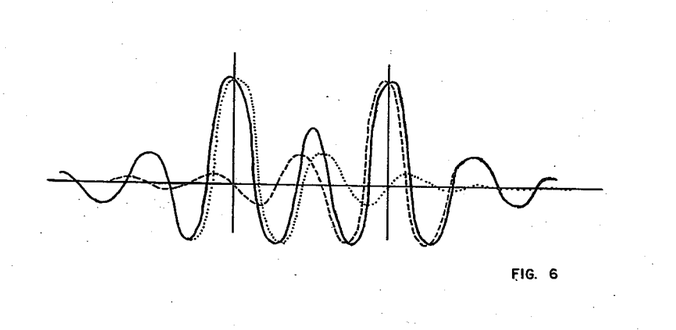
Fig. 6 indicates the shape of the correlation curve when two events occur at nearly the same time and wherein the conditions of frequency and attenuation are similar to those described in connection with Fig. 4.

Figs. 5 and 6 have been drawn to indicate and explain the required characteristics of the correlation curve, necessary for an accurate determination of the travel time and for preventing any ambiguity in this determination when a plurality of closely spaced events are present in the composite received signal.

As previously explained, Fig. 3 illustrates the correlation curve derived by multiplying and integrating a received signal with its counterpart when the received signal has been propagated through an ideal propagating medium which has no attenuating effect on any of the frequency components and the curve assumes also that the received signal is derived from only a single travel path.

If it were possible to separately receive the transmitted signal after it had been propagated over two different ideal propagation paths and if the propagation paths were such as to cause the received signal to be slightly out-of-time phase, then the correlation curves derived by multiplying and integrating such separately received signals with their counterparts could be illustrated respectively by the dotted-and-dashed curves in Fig. 5. If we then add or composite these two curves, a resultant composite correlation curve like that shown by the full lines in Fig. 5 would result. It is self-evident that under those conditions the desired primary maxima will be substantially accentuated with respect to the secondary maxima so that the indications from the correlation curves of the different travel paths become so pronounced as to substantially reduce the possibility of confusion between the two travel times.

If the earth were a perfect propagating medium and there were two distinct reflection beds giving rise to two travel paths for the transmitted signal of slightly different travel times, then the curve illustrated in Fig. 5 would be the same as that obtained by multiplying and integrating the counterpart signal with the total or composite received signal. As a practical matter, however, it is impossible to use a perfect propagating medium when doing seismographic exploration.

When a signal is propagated through the earth along two paths of only slightly different travel times without the use of the present invention, the resulting correlation curve will appear as in Fig. 6. The dotted and dashed lines in Fig. 6 represent the separate correlation curves of the two received signals, and the solid curve is obtained by adding in the same manner as in Fig. 5. The earth severely attenuates the high frequency components of the signals to flatten or broaden the correlation curves (the dotted and dashed curves) as previously described in connection with Fig. 4. As a result, the resultant composite correlation curve (the solid line curve) is also broadened to provide only a slight difference between the primary maxima and the secondary maxima. It will be readily observed that the travel times are not clearly distinguishable. The solid line curve illustrated in Fig. 6 would be the same as that obtained by multiplying and integrating the total or composite received signal with a counterpart signal.

A study of Figs. 5 and 6 shows that the peaks of the correlation curves may be accentuated and sharpened by:

a. Widening the frequency range of the transmitted signal, and/or b. Equalizing the contribution to the correlation values of the different frequency components throughout the entire range.

Figure 10:
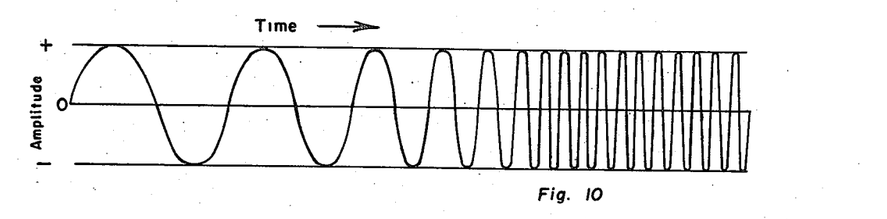
Fig. 10 is a representation of a transmitted signal wherein the high frequency portion of the signal has been transmitted for a longer duration than the lower frequency portion of the signal.
Figure 11:
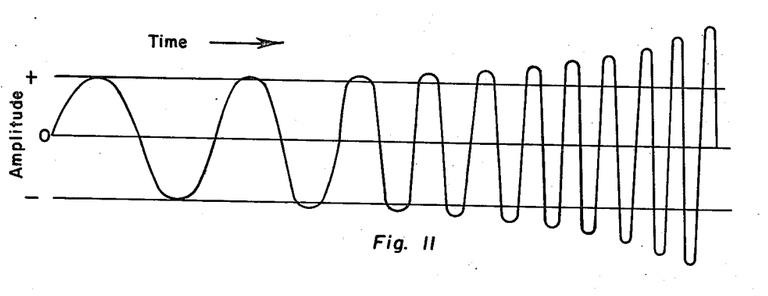
Fig. 11 is a representation of a transmitted signal wherein the higher frequency portion of the signal is transmitted at a higher energy level than the lower frequency portion of the signal.

The present invention achieves at least a partial equivalent of an ideal propagating medium by equalizing the contribution to the correlation values of the different frequency components throughout the entire frequency range. In providing this equalization, the effect of some portion of the frequency components contributing to the correlation curve is intensified, as, for example, by one or more of the following specific ways:

1. Transmitting the attenuated frequency components for a relatively longer period (Fig. 10).
2. Transmitting the attenuated frequency components of the transmitted signal at a relatively higher energy level (Fig. 11).
3. Selectively amplifying the attenuated frequency components of either the received signal (Fig. 13) or the counterpart signal (Fig. 12).
4. Selectively attenuating the non-attenuated frequency components of either the received signal (Fig. 15) or the counterpart signal (Fig. 14), or both.

These several ways will now be described in detail in ths order in which they have been enumerated.

1. Longer duration of transmission of the attenuated frequencies. This method constitutes a preferred form of the invention and will be described in detail with reference to Figs. 7, 9, and 10.

Figure 7:
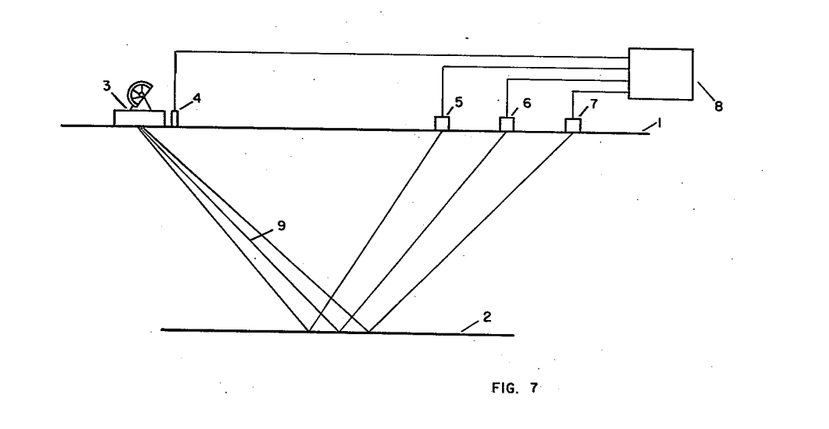
Fig. 7 is a schematic representation of one manner in which the invention may be practiced in seismic exploration.

In Fig. 7, the surface of the earth is indicated by line 1 and a reflector bed is indicated by line 2. An unbalanced flywheel 3 represents an elastic wave generator for transmitting energy in the desired frequency range, such as, from 20 to 80 cycles. A counterpart of the signal transmitted by the source 3 is provided by a detector 4. The elastic energy reaching the surface 1 is detected by a line of detectors 5, 6, and 7 commonly called a spread of detectors and well known to persons familiar with the art. The electrical variations generated by detectors 4, 5, 6, and 7 separately and simultaneously are recorded by recorder 8 in such a way that they may be reproduced in a known phase relationship relative to their phase relationship as originally recorded. Let us suppose that the reflected path 9 corresponding to reflector bed 2 is under investigation and that the propagating medium attenuates severely the high frequencies, let us say above 60 cycles per second, as illustrated in Fig. 9. This may be discovered by originally transmitting a signal of linearly varying frequency from 20 to 80 cycles per second, recording the representative signals, correlating them and discovering that the correlation curve has only frequency variations below 60 cycles. The next step is then to operate the transmission in two times. First, transmit and record signals comprising frequencies varying from 20 to 50 cycles for a relatively short time interval, then transmit and record for a longer time intervals signals comprising frequencies varying from 50 to 80 cycles per second. In other words, a complete transmitted signal would appear as in Fig. 10, with the high frequency portion of the spectrum being of longer duration than the low frequency portion.

When such records have been obtained they are sequentially assembled into a loop, as was explained in the above-mentioned copending application, Ser. No. 426,182, and finally correlated. If the different transmission periods of the two frequency bands have been properly proportioned, the effect on the correlation values of the attenuation by the propagating medium of the high frequency components of the propagated signal is greatly reduced.

In all the preceding description the recording of the signals was done in such a way that signals may be generated during the playback of such a record, which are representative of the frequency, amplitude, and phase relation or time shift of the signals originally recorded. Such a record is usually referred to as a "memory record" since it is a long term memory device by means of which the signals may be stored for a long period of time. Such "memory records" are usually either photographic or magnetic. They may be edited or "composited" before the playback operation. Such editing is done by cutting and splicing together portions of the record or film on which the signals have been stored in a manner entirely similar to the one used in editing a movie scene. During such editing, undesired portions of any records may be cut out and the composite loop as finally produced may consist of a series of juxtaposed records or sections thereof taken in the same area but at different times to jointly contribute to the determination of a common correlation value. It is possible to control by means of this editing and compositing the different factors which determine the shape of the correlation curve and to remedy some undesired results obtained from a systematic field procedure. An advantage of this method is that if it is found that a portion of the range of frequencies is still not properly contributing to the correlation value, more signal in this frequency range may be generated and recorded, and this new record composited with the original record to obtain the desired result. This is possible because the correlation process operates in the time domain and it is immaterial when the signals are generated and recorded, the over-all contribution being obtained only during the multiplication and integration steps of the process. In this first way of practicing the invention, the equalization of the contribution to the correlation values of the different frequency components throughout the entire range is obtained by increasing the relative number of products used in the correlation step which are of smaller average magnitude than the others because of the attenuation of those frequency components of the received signal.

2. Higher energy level of transmission of the attenuated frequencies. The same goal may be obtained by controlling the relative amplitude of the different frequency components of the transmitted signal, as illustrated schematically in Fig. 11. This may be accomplished in many different ways. In fact when a simple unbalanced flywheel vibrator, as shown in Fig. 7, is employed to generate the signal, the amplitude of the transmitted signal is proportional to the square of the frequency. This fixed law of variation does not usually give the proper compensation of the attenuating effect of the propagating medium. However, since the compensation may be performed during the correlation step, successive records, obtained during successive periods of transmission with unbalanced weights of different size or positioned in such a way that the distances between the axis of rotation and the center of gravity of the rotating mass is changed between each transmission period, may be composited together to form a final record to be used for correlation purposes. In this second way of practicing the invention, the equalization of the contribution to the correlation values of the different frequency components throughout the entire range is obtained by varying the frequency and the amplitude of the transmitted signal to compensate the attenuation of these frequency components of the propagated signal by the propagating medium. By this scheme, it is possible to obtain a substantially constant amplitude of the frequency components of the received signal, as illustrated by the curve of Fig. 8. If, in the same time, the sampling of the transmitted signal is such that the counterpart signal has constant amplitude (as again illustrated by the curve of Fig. 8), the contribution to the correlation values of all the frequency components will be the same.

Figure 12:
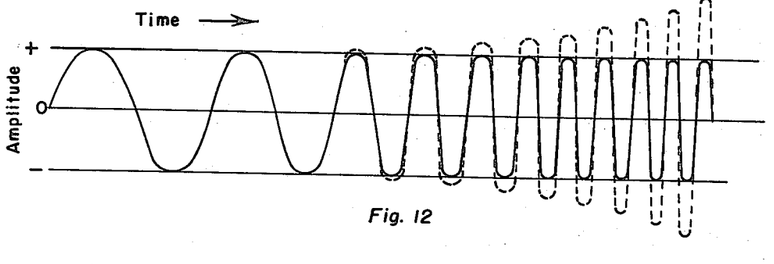
Fig. 12 is a representation of the effect of an increase in the energy level of the higher frequency portion of a counterpart signal which may be obtained by amplifying the high frequency portion of a counterpart or transmitted signal. The solid curve is a representation of a counterpart or a transmitted signal having a constant energy level throughout the frequency range, and the dashed portion of the curve represents the effect of amplifying the high frequency portion of the counterpart signal.
Figure 13:
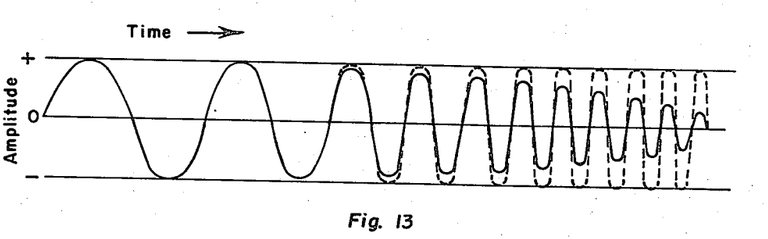
Fig. 13 is a representation of the amplification of the higher frequency portion of a typical received signal which has been attenuated by a propagating medium. The solid curve represents a typical received signal which has been transmitted through an attenuating medium such as the earth, and the dashed portion of the curve (along with the solid portion to the left of the dashed portion) represents the same received signal after amplification of the higher frequency portion of the signal.

3. Selective amplification of the attenuated frequency components of either the received or the counterpart signal. This method constitutes also a preferred embodiment of the invention and it will be described in some detail. Whereas the selective amplification may be applied to either the counterpart signal (as illustrated in Fig. 12) or received signal (as illustrated in Fig. 13), or both, we will make the description as applied to the received signal since it corresponds to our actual customary practice.

When operating the vibrator and recorder set-up displayed in Fig. 7, it is necessary to amplify the received signals generated by detectors 5, 6, and 7. Thus, the vibrator may be operated to transmit a signal varying between 20 and 50 cycles per second, and the received signals are recorded with a predetermined degree of amplification. Then during another transmission period, the transmitted signal is varied within the frequency range of 50 to 80 cycles per second and the received signals are simultaneously recorded with a different degree of amplification, higher or lower than the said predetermined degree used for the low frequency range, if the high frequencies are respectively more or less attenuated than the low frequencies. This amplification does not have to be performed ahead of the recording but may also be done during the playback ahead of the multiplying step. This last arrangement gives greater flexibility since different degrees of selective amplification may be tried without having to repeat the transmitting and recording operation in the field.

Figure 14:
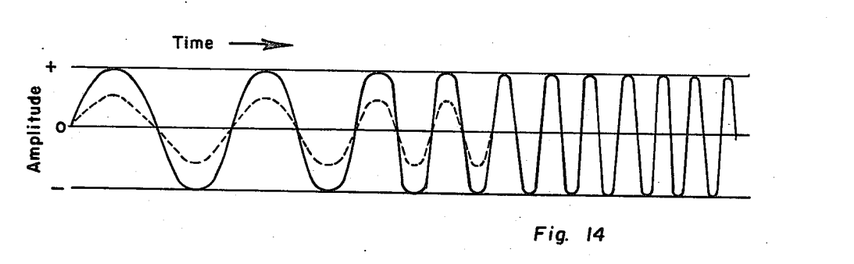
Fig. 14 is a representation of the attenuation of the non-attenuated portion of a transmitted or counterpart signal. The solid curve is a representation of a typical transmitted or counterpart signal having a uniform amplitude throughout the frequency range, and the dashed portion of the curve illustrates the effect of attenuating the lower frequency portion of the signal to compensate for the attenuation of a signal transmitted through a medium such as the earth.
Figure 15:
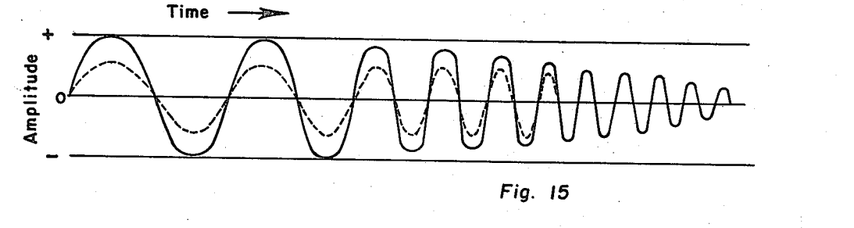
Fig. 15 is an illustration of the attenuation of a received or composite signal. The solid line curve is a representaton of a typical receved signal after having been propagated through a medium which attenuated the high frequency portion of the signal, and the dashed curve (along with the solid curve to the right of the dashed curve) represents the received signal after attenuation of the lower frequency portion of the signal to provide a final received or composite signal having substantially a uniform energy level throughout its frequency range.

4. Selective attenuation of the non-attenuated frequency components of either the received signal (as illustrated in Fig. 15) or the counterpart signal (as illustrated in Fig. 14), or both. It is obvious that the results obtained by selective amplification of the attenuated components could be secured by selective attenuation of the non-attenuated components, but this method would require a longer integration time to obtain the same signal to noise ratio in the parameters used to determine the travel time. Consequently, this last method is not considered of practical interest.

The preceding description of the relation between the characteristics of the received and counterpart signals and the characteristics of the cross-correlation curve is a consequence of the mathematical relations existing between the amplitude and phase spectra of the functions and the amplitude and phase spectrum of their cross-correlation.

If two functions $f_1(t)$ and $f_2(t)$ may be represented by Fourier integrals as $$f_1(t) = \int_0^\infty h(w) \cos[wt - p(w)] dw = \int_{-\infty}^\infty g(w) e^{iwt} dw$$

and $$f_2(t) = \int_0^\infty k(w) \cos[wt - r(w)] dw = \int_{-\infty}^{+\infty} j(w) e^{iwt} dw$$

where $g(w)$ and $j(w)$ are their Fourier spectra and $h(w)$ and $k(w)$ their amplitude spectra and $p(w)$ and $r(w)$ their phase spectra, their cross-correlation function is defined as:

$$q_{12}(t) = \lim_{T \to \infty} \frac{1}{2T} \int_{-T}^{+T} f_1(t+t) f_2(t) dt$$

representing the time average value of their product and it may be proven that the Fourier spectrum $\Phi_{12}(w)$ of said cross-correlation function defined by $$\Phi_{12}(w) = \frac{1}{2\pi} \int_{-\infty}^{+\infty} q_{12}(t) e^{-iwt} dt$$

and such that $$q_{12}(t) = \int_{-\infty}^{+\infty} \Phi_{12}(w) e^{iwt} dw$$

is given in function of the Fourier spectra of the functions by the relation $$\Phi_{12}(w) = g(w) \cdot \overline{j(w)}$$

where $\overline{j(w)}$ indicates the conjugate of $j(w)$ that is, since $$j(w) = a(w) + ib(w)$$

$$\overline{j(w)} = a(w) - ib(w)$$

Expressed in function of the amplitude and phase spectra it may also be proven that the amplitude spectrum of the cross-correlation function is equal to one half of the product of the amplitude spectra of each of the functions, except that the null harmonic component of the cross-correlation function has an amplitude equal to the product of the amplitudes of the null harmonic components of each function and that the phase spectrum of the cross-correlation function is equal to the difference between the phase spectra of each of the functions. These relations explain how a modification of the time series which are cross-correlated affects the shape and characteristics of the cross-correlation curve. Thus, when the propagating medium attenuates the high frequency components of the received signals, it also diminishes the amplitude of the high frequency components of the cross-correlation function, if one of the methods described earlier is not applied to compensate for this attenuation.

It is well to mention now that the attenuation by the propagating medium which has to be compensated for in order to restore the desired characteristics of the correlation curve in the neighborhood of one of its peaks, is the relative attenuation of the different frequencies along the path which has a travel time equal to the time phase delay which has to be imposed to the counterpart signal during the correlation step to provide said peak on the correlation curve. This attenuation can be determined only by examination of the correlation curve as it has been explained previously. It must not be confused with the large variations with frequencies of the amplitudes of the received composite signal, which variations indicate only the relative attenuation of the different frequencies along the path followed by the greatest energy portion of the transmitted signal.

This attenuation of the main energy path is only a factor on the shape of the correlation curve around its own corresponding peak and is not representative of the different attenuation of the other paths.

Since the shaping of the correlation curve may be performed by modifying the counterpart signal or the received composite signal during the playback and correlation operation, it is obvious that some information relative to the physical properties of the geological beds, through which the elastic wave energy has been propagated, or in which the wave energy may have been reflected or refracted, may be derived at least qualitatively and possibly quantitatively from the modifications of said signals necessary to obtain a predetermined and desired shape of the correlation curve. This information is very useful in particular for the discovery of stratigraphic traps, a well known type of oil deposits which cannot be found with mere structural information.

We have explained previously what the most desired characteristics of the correlation curve are: (1) The peaks of that curve must have a large amplitude compared to the secondary maxima and (2) they must be sharp to provide an accurate determination of the corresponding travel time. These requirements may be expressed by saying that the unidirectional rate of change in the magnitude of the correlation value as it approaches its maxima must be made as large as possible by modifying the relative amplitudes of the different frequency components of the signals.

Other modes of applying the principle of the invention may be employed, change being made as regards the details described, provided the features stated in any of the following claims or the equivalent of such be employed.

We, therefore, particularly point out and distinctly claim as our invention:

1. In the process of determining the travel time of a signal between spaced points wherein there is transmitted from a local area a vibratory signal made up of a succession of energy pulses which, after propagation over a plurality of paths, is then detected as a composite signal in a remote local area, which transmitted signal is non-repetitive during a time interval which is substantially longer than the travel time of such signal along any of said paths by which it reaches the detection area at usable energy levels and in which, for a predetermined period which is at least as long as said travel time plus the uninterrupted duration of said transmitted signal or two times the travel time whichever is the shorter, there are simultaneously and individually recorded time series respectively representative of said transmitted signal and said composite signal and such time series are then correlated while shifting the time-phase relation thereof with respect to their time-phase relation as originally recorded and in which the amount of said time-phase shift which yields the greatest magnitude of the correlation value is a parameter of said travel time, the improvement which comprises intensifying the effect of at least a portion of at least one of said time series upon said correlation values to counteract the effects on said correlation values which are due to the unequal attenuation by the propagating medium of different frequency components of said transmitted signal.

2. A process in accordance with claim 1 characterized further in that said intensifying effect is secured through the time series representative of the transmitted signal.

3. A process in accordance with claim 1 characterized further in that said intensifying effect is secured through the time series representative of the composite signal.

4. A process in accordance with claim 1 characterized further in that said intensifying effect is secured by a modification of the time series representative of the transmitted signal.

5. A process in accordance with claim 1 characterized further in that said intensifying effect is secured by a modification of the time series representative of the composite signal.

6. A process in accordance with claim 1 characterized further in that said intensifying effect is secured by a selective amplification of at least one frequency component of one of said signals.

7. A process in accordance with claim 1 characterized further in that said intensifying effect is secured by raising the energy level of that portion of the transmitted signal which is most attenuated by said propagating medium.

8. A process in accordance with claim 1 characterized further in that said portion of at least one of said time series, the effect of which on said correlation values is intensified, is a parameter of a portion of one of said signals a characterizing feature of which portion is its frequency.

9. A process in accordance with claim 1 characterized further in that said intensifying effect is secured by changing the relative durations of the time intervals during which different components of said transmitted signal which lie within different frequency ranges are transmitted.

10. A process in accordance with claim 1 characterized further in that said intensifying effect is secured by increasing the time interval during which is generated that component of the transmitted signal which is most attenuated by the propagating medium.

11. In the process of determining the travel time of a signal between spaced points wherein there is transmitted from a local area a vibratory signal made up of a succession of energy pulses which, after propagation over a plurality of paths, is then detected as a composite signal in a remote local area, which transmitted signal is non-repetitive during a time interval which is substantially longer than the travel time of such signal along any of said paths by which it reaches the detection area at usable energy levels and in which, for a predetermined period which is at least as long as said travel time plus the uninterrupted duration of said transmitted signal or two times the travel time whichever is the shorter, there are simultaneously and individually recorded time series respectively representative of said transmitted signal and said composite signal and such time series are then correlated while shifting the time-phase relation thereof with respect to their time-phase relation as originally recorded and in which the amount of said time-phase shift which yields the greatest magnitude of the correlation value is a parameter of said travel time, the improvement which comprises increasing the unidirectional rate of change in the magnitude of said correlation values as they approach their maxima pursuant to said shift in time-phase relation between said time series by substantially nullifying the effects on said correlation value of the effect of the propagating medium on the transmitted signal as represented by the differences, other than out-of-time-phase relation, between the time series representative of said transmitted composite signals.

12. In the process of determining the travel time of a signal between spaced points wherein there is transmitted from a local area a vibratory signal made up of a succession of energy pulses which, after propagation over a plurality of paths, is then detected as a composite signal in a remote local area, which transmitted signal is non-repetitive during a time interval which is substantially longer than the travel time of such signal along any of said paths by which it reaches the detection area at usable energy levels and in which, for a predetermined period which is at least as long as said travel time plus the uninterrupted duration of said transmitted signal or two times the travel time whichever is the shorter, there are simultaneously and individually recorded time series respectively representative of said transmitted signal and said composite signal and such time series are then correlated while shifting the time-phase relation thereof with respect to their time-phase relation as originally recorded and in which the amount of said time-phase shift which yields the greatest magnitude of the correlation value is a parameter of said travel time, the improvement which comprises determining the modifying effect of the propagating medium on said transmitted signal as reflected by differences other than the out-of-time-phase relationship between the time series respectively representative of said transmitted and composite signals and then modifying one of said time series to counteract the effect on said correlation value of the said effect on the transmitted signal by the propagating medium, before said time series are correlated.

13. In the process of determining the travel time of a signal between spaced points wherein there is transmitted from a local area a vibratory signal made up of a succession of energy pulses which, after propagation over a plurality of paths, is then detected as a composite signal in a remote local area, which transmitted signal is non-repetitive during a time interval which is substantially longer than the travel time of such signal along any of said paths by which it reaches the detection area at usable energy levels and in which, for a predetermined period which is at least as long as said travel time plus the uninterrupted duration of said transmitted signal or two times the travel time whichever is the shorter, there are simultaneously and individually recorded time series respectively representative of said transmitted signal and said composite signal and such time series are then correlated while shifting the time-phase relation thereof with respecti to their time-phase relation as originally recorded and in which the amount of said time-phase shift which yields the greatest magnitude of the correlation value is a parameter of said travel time, the improvement which comprises substantially nullifying the modifying effect on the correlation value of the effects of the propagating medium on said transmitted signal as reflected by differences, other than the out-of-time-phase relationship, between the time series respectively representative of said transmitted and composite signals, by oppositely modifying the time series representative of said composite received signal.

No references cited.